(12) United States Patent
Klein et al.

(10) Patent No.: US 7,780,225 B2
(45) Date of Patent: Aug. 24, 2010

(54) SEATING APPARATUS FOR ARRANGEMENT IN A DRIVER'S CABIN

(75) Inventors: Thomas Klein, Wehr (DE); Thomas Haubrich, Goedenroth (DE)

(73) Assignee: BOMAG GmbH, Boppard (DE)

( * ) Notice: Subject to any disclaimer, the term of this patent is extended or adjusted under 35 U.S.C. 154(b) by 114 days.

(21) Appl. No.: 12/037,645

(22) Filed: Feb. 26, 2008

(65) Prior Publication Data

US 2008/0203753 A1  Aug. 28, 2008

(30) Foreign Application Priority Data

Feb. 26, 2007 (DE) ........................ 10 2007 009 224
Apr. 22, 2007 (DE) ........................ 10 2007 018 744

(51) Int. Cl.
B60N 2/38 (2006.01)
B60N 2/06 (2006.01)

(52) U.S. Cl. .............................. 296/190.08; 296/65.11; 296/65.13; 297/195.11; 297/344.1

(58) Field of Classification Search .............. 296/65.11, 296/65.12, 65.13, 65.14, 65.15, 190.08; 297/195.11, 297/215.13, 344.1

See application file for complete search history.

(56) References Cited

U.S. PATENT DOCUMENTS 3,718,365 A  *  2/1973  Gibson .................. 297/344.24
5,516,179 A  *  5/1996  Tidwell ........................ 296/63
5,632,521 A       5/1997  Archambault
6,113,175 A  *  9/2000  Guim ....................... 296/65.18
6,129,405 A       10/2000 Miyahara
6,648,393 B1 * 11/2003  Milnar .................... 296/65.11
2006/0225935 A1 10/2006  Avikainen
2009/0021064 A1 *  1/2009 Shao ....................... 297/344.1

FOREIGN PATENT DOCUMENTS

| DE | 198 13 474 A1 | 10/1999 |
| EP | 0733742 | 9/1996 |
| EP | 0733742 A | 9/1996 |
| EP | 0935025 A | 8/1999 |

* cited by examiner

*Primary Examiner*—Jason S Morrow
(74) *Attorney, Agent, or Firm*—Baker & Hostetler, LLP

(57) ABSTRACT

A seating apparatus is described for arrangement in a driver's cabin of a construction vehicle, especially a soil compacting machine, comprising a treading surface and an operating desk. The seating apparatus comprises a driver's seat and an adjusting device, and the adjusting device comprises two guide rails and a seat carrier. The seat carrier is held on the guide rails and is adjustable transversally to the traveling direction of the construction vehicle. The guide rails are arranged next to the treading surface used by the driver in such a way that the seat carrier can be displaced relative to the treading surface in a freely floating manner over the same.

14 Claims, 3 Drawing Sheets

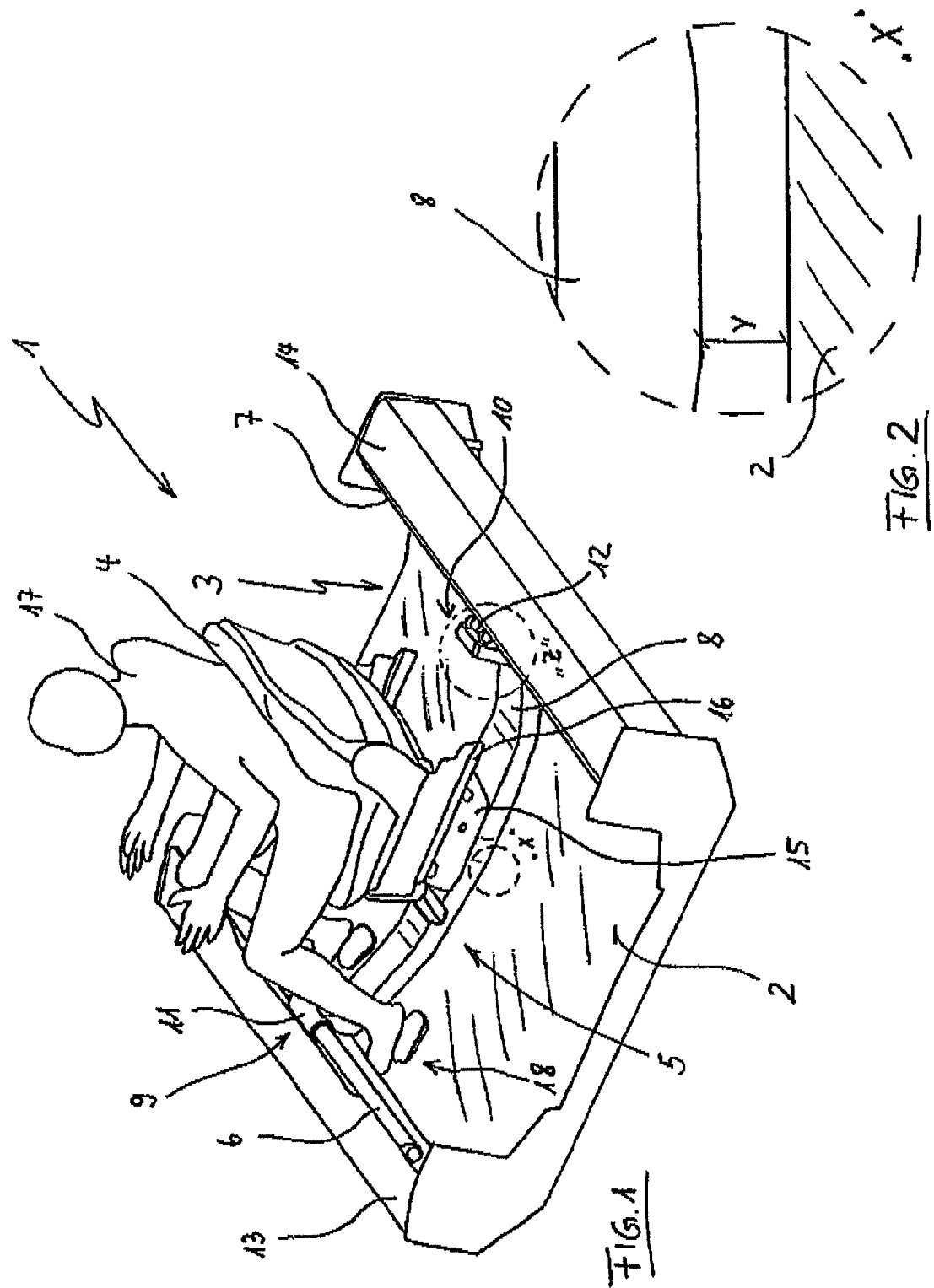

SEATING APPARATUS FOR ARRANGEMENT IN A DRIVER'S CABIN

PRIORITY

This application claims priority of German patent application DE 102007009224.7 filed Feb. 26, 2007 and German patent application DE 102007018744.2 filed Apr. 22, 2007. The contents of both applications are incorporated herein by reference in their entireties.

FIELD OF THE INVENTION

The present invention relates to a seating apparatus for arrangement in a driver's cabin of a construction vehicle, especially a soil compacting machine, comprising at least one treading surface and an operating desk, with the seating apparatus comprising a driver's seat and an adjusting device, and with the adjusting device comprising two guide rails and a seat carrier, with the seat carrier, which is adjustable transversally to the traveling direction of the construction vehicle, being held on the guide rails.

BACKGROUND OF THE INVENTION

The seating apparatuses of this kind which are known from the state of the art comprise guide rails which are arranged in the floor region or on the treading surface of the driver's cabin. The driver's seat can be connected via a seat carrier with the guide rails and is arranged adjustably on the same extending in the longitudinal direction on the guide rails. The driver's seat is connected directly with the guide rails or forms the adjusting device with the seat carrier and the guide rails. The guide rails are arranged in the floor region or on the treading surface in such a way that they extend parallel to each other in the transversal direction to the roadway and substantially completely beneath the seat or seat carrier. This is disadvantageous for many reasons.

The driver entering the driver's cabin for operating the construction machine is forced to step over or onto the guide rails at least in certain sections of the same in order to reach the driver's seat of the construction machine and to thus assume his working position. This is dangerous and disadvantageous since the driver may trip over the guide rails or twist his ankle in the process. The driver may need to leave the driver's cab several times per hour and thus the likelihood of a work accident increases. Since a complete adjustability of the seat carrier in the longitudinal direction of the guide rails needs to be ensured, it is not possible to cover sections of the guide rails. This leads to an increased need for maintenance and an increased likelihood of damaging the guide rails. A further disadvantage of the known arrangement of the guide rails is that once the driver has assumed his working position it is necessary for him to make frequent changes in his position. The guide rails arranged on the treading surface beneath the seat will also cause a disturbance in this case too.

The invention is therefore based on the object of providing a seating apparatus of the kind mentioned above which avoids the disadvantages known from the state of the art and further offers improved durability.

SUMMARY OF THE INVENTION

This object is achieved by a seating apparatus for arrangement in a driver's cabin of a construction vehicle, especially a soil compacting machine, comprising a treading surface and an operating desk, with the seating apparatus comprising a driver's seat and an adjusting device, and with the adjusting device comprising two guide rails and a seat carrier, with the seat carrier being held on the guide rails. The seat carrier is adjustable transversally to the traveling direction of the construction vehicle, wherein the guide rails are arranged next to the treading surface used by the driver in such a way that the seat carrier can be displaced relative to the treading surface in a freely floating manner over the same and that the seat carrier's width is chosen in such a way that the seat carrier extends between the driver's legs in order to enable the driver to put his feet on the treading surface without obstruction.

The seating apparatus in accordance with the invention differs from the initially described seating apparatuses in such a way that the guide rails are arranged next to the treading surface used by the driver in such a way that the seat carrier can be displaced relative to the treading surface in a freely floating manner over the same. It follows from this that the treading surface used by the driver or foot space used by the driver is free from guide rails. The final distance between the bottom side of the seat carrier and the treading surface is irrelevant in accordance with the invention as long as it is ensured that a freely floating arrangement of the seat carrier relative to the treading surface is provided. This offers the advantage that no disturbing guide rails are present which obstruct the driver when entering and exiting or during their work and which might lead to a likelihood of injury to the driver.

The seat carrier can preferably be arranged in the form of a cross-beam, especially in the manner of an aluminum casting. It is also possible to arrange the seat carrier as an iron casting or welded part. The arrangement as an aluminum casting comes with the advantage that the seat carrier has a relative low own weight and thus ensures better adjustability. It is further possible to arrange the seat carrier in a straight manner or preferably in a bow-shaped manner, with the ends of the legs of the seat carrier facing upwardly in the case of bow-shaped embodiment, i.e. they face away from the treading surface or the floor of the driver's cabin.

In order to enable an adjustment or movement of the seat carrier, means can be provided on the seat carrier which are arranged in a manner as to be functionally complementary to the guide rails and enable the adjustment of the seat carrier in the longitudinal direction of the guide rail.

Preferably, these means are arranged in the manner of a linear bearing or a roller guide. It is also possible to provide one end of the seat carrier with a linear bearing and one end with a roller guide. The roller guide can be provided with arresting means which allow arresting the lateral displacement of the seat. The driver's seat or seat carrier can then be arrested in a freely selected position on the guide rails, as required. In other words, one end of the seat carrier can be connected rigidly with the guide rail, e.g. via a linear bearing, whereas the other end is placed via a roller guide merely on a guide rail which is functionally complementary. As a result, the seat carrier can be lifted when required and can be pivoted about the longitudinal axis of the linear bearing or the associated guide rail. In this case, the complete treading surface of the driver's cabin would be freely accessible.

One embodiment provides that, when seen in the traveling direction, a guide rail can be arranged slightly in front of and one guide rail at least slightly behind the driver's seat, with the seat carrier extending between the guide rails. The seat carrier corresponds in its longitudinal alignment substantially to the distance between the two guide rails. The size of this distance depends on the size of the driver's cabin or the size of the available treading surface.

A preferred embodiment provides that at least the front guide rail can be arranged elevated relative to the treading surface, but preferably at the level of the driver's shinbone, which is not mandatory in any way. This is advantageous in the respect that the driver can use the entire footwell, i.e. also the footwell beneath the guide rail.

Each guide rail can further be associated with a support or carrier element, with the guide rail being fastened at least in sections to the support or carrier element. The support or carrier element can be arranged as a separate component which is especially adjusted to the respective guide rail. It is also possible that sections or parts of the driver's cabin form the support or carrier element, preferably the front, rear or side walls of the driver's cabin. The guide rail must preferably be fastened or arranged in such a way that complete usability can be ensured with respect to the displacement path of the seat carrier.

When linear guide means or the like are used, the guide rail can preferably be arranged as a shaft or roller. A combination of shaft and linear bearing offers the advantage of a cost-effective embodiment with virtually maintenance-free operation.

It is also possible to arrange the guide rail in the manner of a slide or linear guide means. Linear guide means can also be understood in this case for example as a guide rail provided with a rectangular cross section. An associated means which is functionally complementary, such as a bearing unit in particular, ensures the adjustability of the seat carrier on the guide rail. In the simplest embodiment, the guide rail can also be arranged with an angular cross section or like a T-profile for example. Respective means on the seat carrier such as rollers, wheels, gearwheels or ball bearings ensure the adjustment of the seat carrier in this case.

An especially preferred embodiment provides that a seat turning unit which can be arrested is provided between the driver's seat and the seat carrier, with the driver's seat being twistable with the help of the seat turning unit about a vertical rotational axis of the seat turning unit about 360 degrees on the seat carrier. The driver can thus orient himself in different directions within the driver's cabin without having to stand up.

Furthermore, means can be provided in addition to the seat turning unit, especially means for seat adjustment, with which the driver's seat can be displaced along the seat carrier for example. A forward and backward movement of the entire seat can cause an adjustment of the leg length and the adjustment of the angle of inclination of the backrest can cause an adjustment of the arm length with respect to the operating desk or control desk to be reached by the driver.

DESCRIPTION OF THE DRAWINGS

An embodiment of the invention will be explained below by reference to the schematic drawings, wherein:

FIG. 1 shows a representation of a driver's cabin floor with a seating apparatus arranged in the driver's cabin;

FIG. 2 shows a first detailed view "X" of FIG. 1 in an enlarged view;

DETAILED DESCRIPTION

Figure 3:
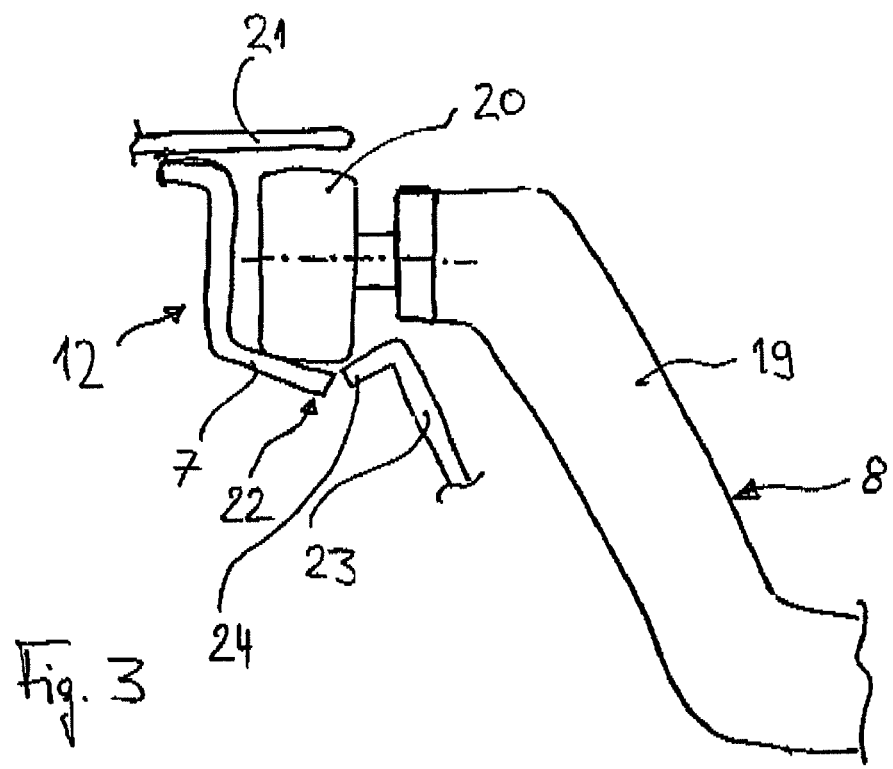
FIGS. 3 and 4 shows a second detailed view "Z" of FIG. 1 in an enlarged cross-sectional view and a perspective view.

FIG. 1 shows a schematic view of a seating apparatus 1 which is arranged in the area of treading surface 2 of the floor 3 of a driver's cabin (not shown in closer detail) of a construction machine, especially a soil compacting machine. Treading surface 2 extends virtually over the entire area of the floor of the driver's cabin.

The seating apparatus 1 comprise a driver's seat 4 and an adjusting device 5. The adjusting device comprises two parallel guide rails 6 and 7 and a seat carrier 8. The two guide rails 6, 7 extend transversally to the traveling direction of the respective construction machine and extend substantially over the width of the treading surface 2. They are arranged in the area of the front or rear boundary of the driver's cabin in the manner that they leave open the entire treading surface 2 of the floor 3 of the driver's cabin. The seat carrier 8 is held in a displaceable manner at its two ends on the two guide rails 6, 7. It is thus adjustable transversally to the traveling direction of the construction vehicle. The driver's seat 4 can thus be displaced transversally to the traveling direction and can be changed in its position relative to the longitudinal axis of the construction vehicle. The first guide rail 6 is arranged at the front end of the treading surface 2 in the manner that the treading surface reaches up to beneath the first guide rail with sufficient space upwardly, so that the driver of the construction vehicle can still slide his feet beneath the first guide rail 6. The second guide rail 7 extends at the rear edge of treading surface 2. The seat carrier 8 thus bridges the entire treading surface 2.

The seat carrier 8 is arranged as a bow-shaped cross-beam whose width has been chosen in such a way that it extends between the driver's legs when the driver's seat 4 is aligned in the traveling direction. The driver can thus place his feet without obstruction on the treading surface 2 next to the cross-beam in any position of the cross-beam. The seat carrier 8 comprises at its two ends 9 and 10 a first and second means 11 and 12 with which it can be adjusted and displaced on the first and second guide rail 6, 7 in its position. The first guide rail concerns a shaft with a round cross section. The first means 11 is arranged as a linear bearing which grasps around the first guide rail 6 in the manner that the seat carrier is transversally displaceable and can be pivoted upwardly when needed. With the first means 11, the seat carrier is thus held also on the first guide rail and is fixed in its angular alignment to the first guide rail 6. The second means 12 concerns a roller guide, preferably two rollers 20 which are spaced from each other in the direction of displacement (FIG. 3) and cooperate with the second guide rail 7 in such a way that the rollers 20 rest from above on the second guide rail 7 and are able to roll off on the same. A removable securing rail 21 (FIG. 3) is arranged above the second guide rail 7 and parallel thereto against inadvertent lifting of the rollers.

To ensure that the seat carrier 8 can be lowered as far as possible and can extend at a low distance Y (FIG. 2) over the treading surface 2 on the one hand, and to ensure that the first and second guide rail 6, 7 can be arranged with sufficient distance from the treading surface 2 on the other hand, the ends of the seat carrier 8 are each provided with an upward bend 19 (FIGS. 3 and 4) which carry the first and second means 11, 12 for bearing.

The guide rails 6 and 7 are arranged in such a way that as a result of the configuration of the seat carrier 8 which extends between the guide rails 6 and 7 an arrangement of the seat carrier 8 is obtained which floats freely relative to the treading surface 2. This freely floating arrangement can clearly be seen in the enlarged illustration according to the detailed view "X" in FIG. 2. The guide rails 6 and 7 are connected with two carrier elements 13 and 14, with the carrier elements 13 and 14 belonging to the constructional arrangement of the driver's cabin floor or the driver's cabin.

An arrestable seat turning unit 15 is arranged between the driver's seat 4 and seat carrier 8, with the driver's seat 4 being twistable with the help of the seat turning unit 15 about a vertical rotational axis of the seat turning unit 15 about 360 degrees, as required. The seat turning unit 15 is arranged substantially centrally on the seat carrier 8 and is detachably connected to the same by fastening means, especially screws. Means 16 in the manner of an adjusting rail are provided with which the driver's seat 4 can be displaced in the traveling direction along the seat carrier 8. The driver 17 can operate an operating or control desk (not shown) in this position which is located in front of the driver 17 above the first guide rail 6 when seen in the traveling direction. The feet of the driver 17 can operate pedals 18 which may optionally be arranged beneath the guide rail 6, with the guide rail 6 extending above the feet, substantially at the height of the shinbones of driver 17. If necessary, the entire seat carrier 8 can be lifted or swiveled about the longitudinal axis of guide rail 6. In the simplest of cases, the end 10 of seat carrier 8 must be lifted from the guide rail 7. In the operating position, the seat carrier 8 can be fixed or arrested on the same by means of the arrestable roller guide of means 12 relating to the longitudinal direction of the guide rails 6 and 7.

FIG. 2 shows an enlarged detailed view "X" according to FIG. 1. It shows the treading surface 2 and the seat carrier 8. Distance "Y" shows that the seat carrier 8 is located in a freely floating arrangement above the treading surface 2. As a result of the respective arrangement of the first and second guide rails 6, 7 in the driver's stand it is possible to omit the guide rails arranged beneath the driver's seat 4, as is known from the state of the art. The driver is thus offered the convenient situation that he does not need to take into account any disturbing guide rails extending on the treading surface 2 of the driver's cabin when the driver enters or exits the cabin or when he changes the position of the seat during his work. The likelihood of a work accident for the driver can be reduced significantly by simultaneously increasing the comfort for the driver.

Figure 4:
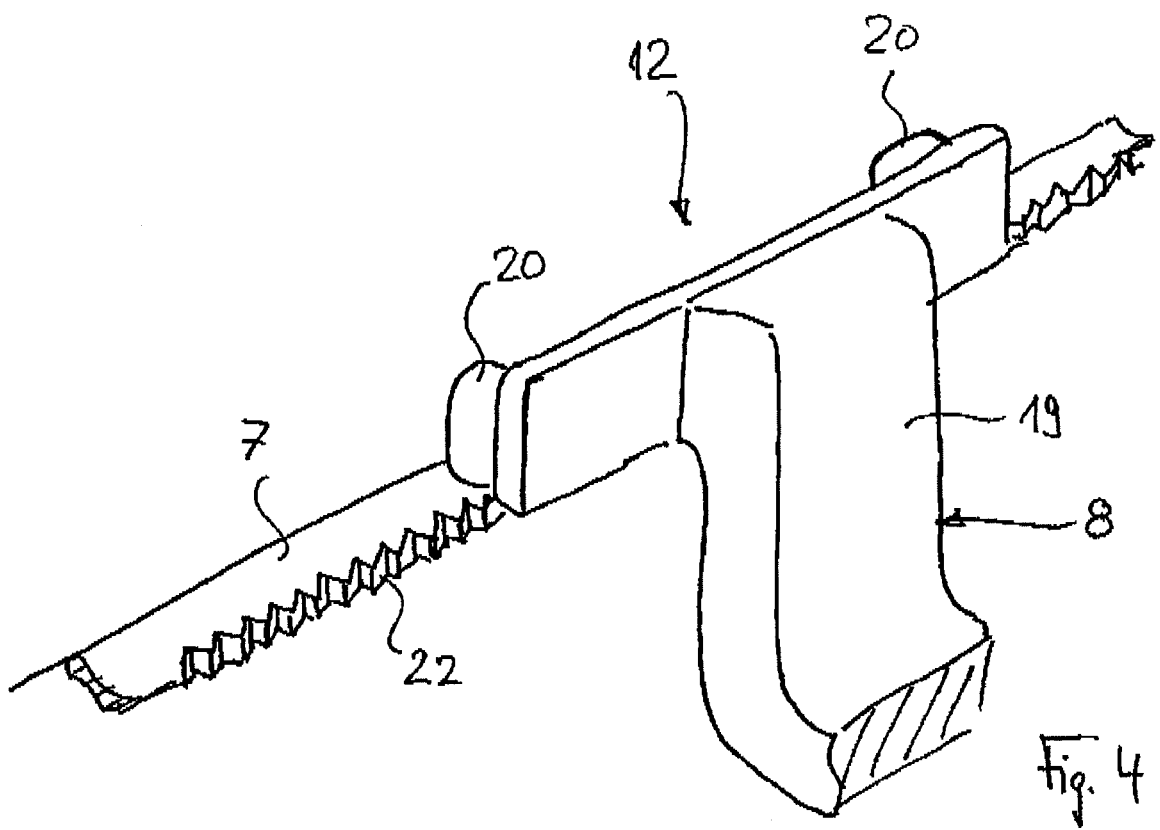

FIGS. 3 and 4 illustrate details of the bearing of seat carrier 8 on the second guide rail 7. Accordingly, the rollers 20 rest on the guide rail 7 which is arranged as a free leg of a profile element. The free edge of the second guide rail 7 or the leg facing the seat carrier 8 is provided with a toothing 22 for arresting the position of the seat carrier 8 along the second guide rail 7. A second toothing 24 engages in a detachable way in said first toothing at the end of an arresting lever 23 which is arranged on the seat carrier 8. As long as the first and second toothing engage into each other, the seat carrier cannot be displaced. A displacement can be made when the arresting lever 23 is removed from engagement with the first toothing.

Figure 5:
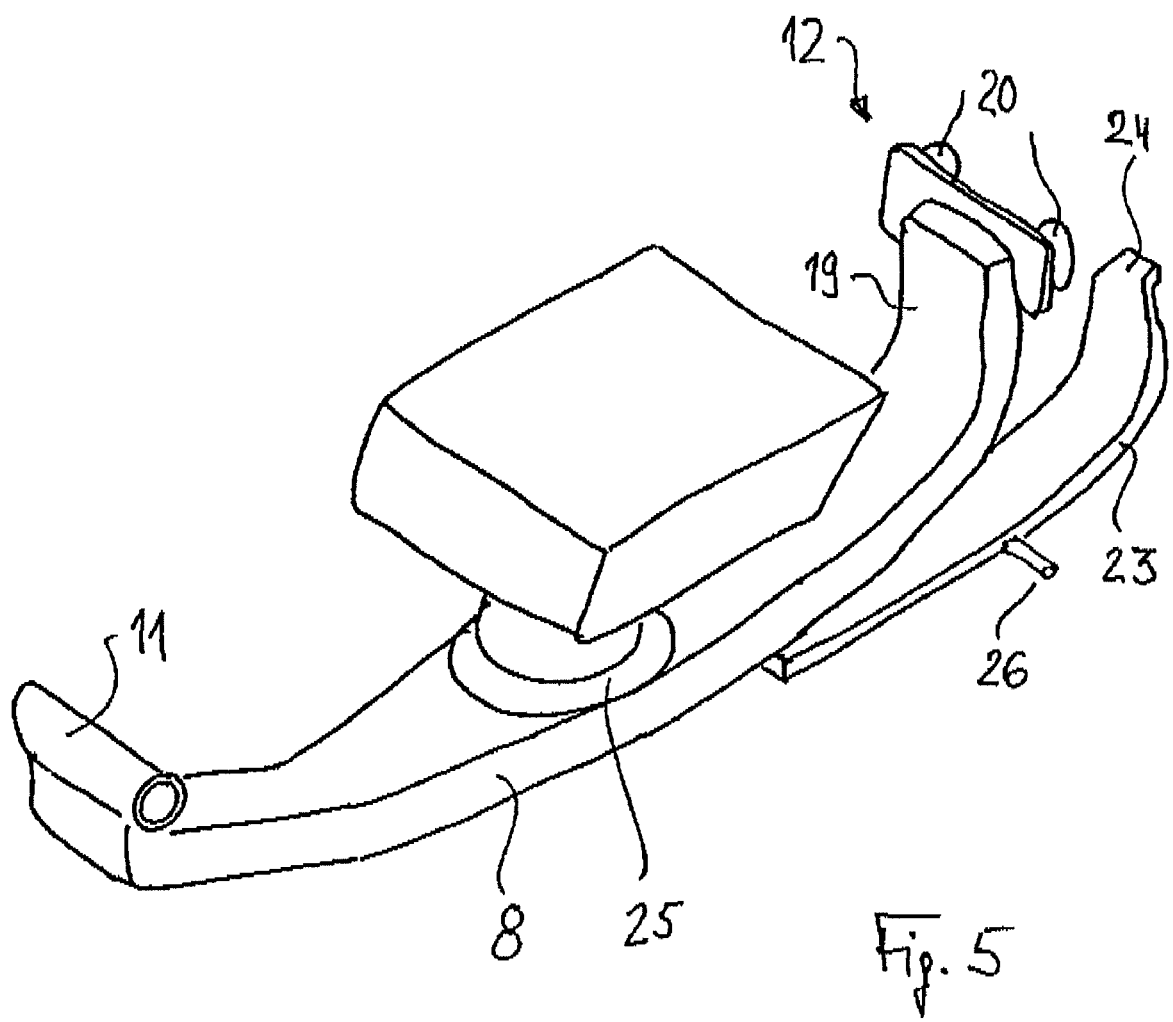
FIG. 5 shows a perspective exploded view of details of the seating arrangement.

As is further shown by FIG. 5, the arresting lever 23 is arranged as a rocker which can be deflected about a horizontal axis 26 parallel to the guide rail 7 in the manner that the second toothing 24 optionally comes into engagement with the first toothing 22 or releases the same. The actuating of the arresting lever occurs via a lever bar linkage system (not shown) which is actuated by the driver. The foot of the seat turning unit 15 is designated further with reference numeral 25 in FIG. 5.

The invention claimed is:

1. A seating apparatus for arrangement in a cabin of a construction vehicle comprising:
   a driver's seat; and
   an adjusting device including two guide rails and a seat carrier,
   wherein the seat carrier is held on the guide rails and is adjustable transversally to the traveling direction of the construction vehicle, and
   wherein the guide rails are arranged next to a cabin treading surface and used by the driver in such a way that the seat carrier can be displaced relative to the treading surface in a freely floating manner over the same, and that the width of the seat carrier is chosen in such a way that the seat carrier extends, in the traveling direction of the construction vehicle, between the legs of the driver, when the driver is facing the traveling direction of the construction vehicle, in order to enable the driver to put his feet on the treading surface without obstruction.

2. A seating apparatus for construction vehicles according to claim 1, wherein the seat carrier is arranged in the form of a cross-beam.

3. A seating apparatus for construction vehicles according to claim 1, wherein means are provided on the seat carrier which are arranged in a manner as to be functionally complementary to the guide rail and enable the adjustment of the seat carrier in the longitudinal direction of the guide rail.

4. A seating apparatus for construction vehicles according to claim 3, wherein the means are arranged in the manner of a linear bearing or roller guide.

5. A seating apparatus for construction vehicles according to claim 1, wherein a guide rail, when seen in the traveling direction, can be arranged at least slightly in front of and one guide rail at least slightly behind the driver's seat, with the seat carrier extending between the guide rails.

6. A seating arrangement for construction vehicles according to claim 5, wherein at least the front guide rail is arranged elevated relative to the treading surface.

7. A seating apparatus for construction vehicles according to claim 1, wherein each guide rail is associated with a support or carrier element, with the guide rail being fastened at least in sections to the support or carrier element.

8. A seating apparatus for construction vehicles according to claim 1, wherein the guide rail is arranged as a shaft.

9. A seating apparatus for construction vehicles according to claim 1, wherein the guide rail is arranged in the manner of a slide or linear guide means.

10. A seating apparatus for construction vehicles according to claim 1, wherein a seat turning unit which can be arrested is provided between the driver's seat and the seat carrier, with the driver's seat being twistable with the help of the seat turning unit about a vertical rotational axis of the seat turning unit about 360 degrees.

11. A seating apparatus for construction vehicles according to claim 10, wherein means are provided with which the driver's seat and/or the seat turning unit can be displaced along the seat carrier.

12. A seating apparatus for construction vehicles according to claim 1, wherein the construction vehicles are soil compacting machines.

13. A seating apparatus for construction vehicles according to claim 1, wherein the cross-beam is an aluminum casting or an iron beam.

14. A seating arrangement for construction vehicles according to claim 6, wherein at least the front guide rail is arranged at the level of the shinbone of the driver.

* * * * *